J. F. & H. E. DODGE.
UNIVERSAL JOINT MECHANISM.
APPLICATION FILED AUG. 27, 1914.
1,144,531.
Patented June 29, 1915.
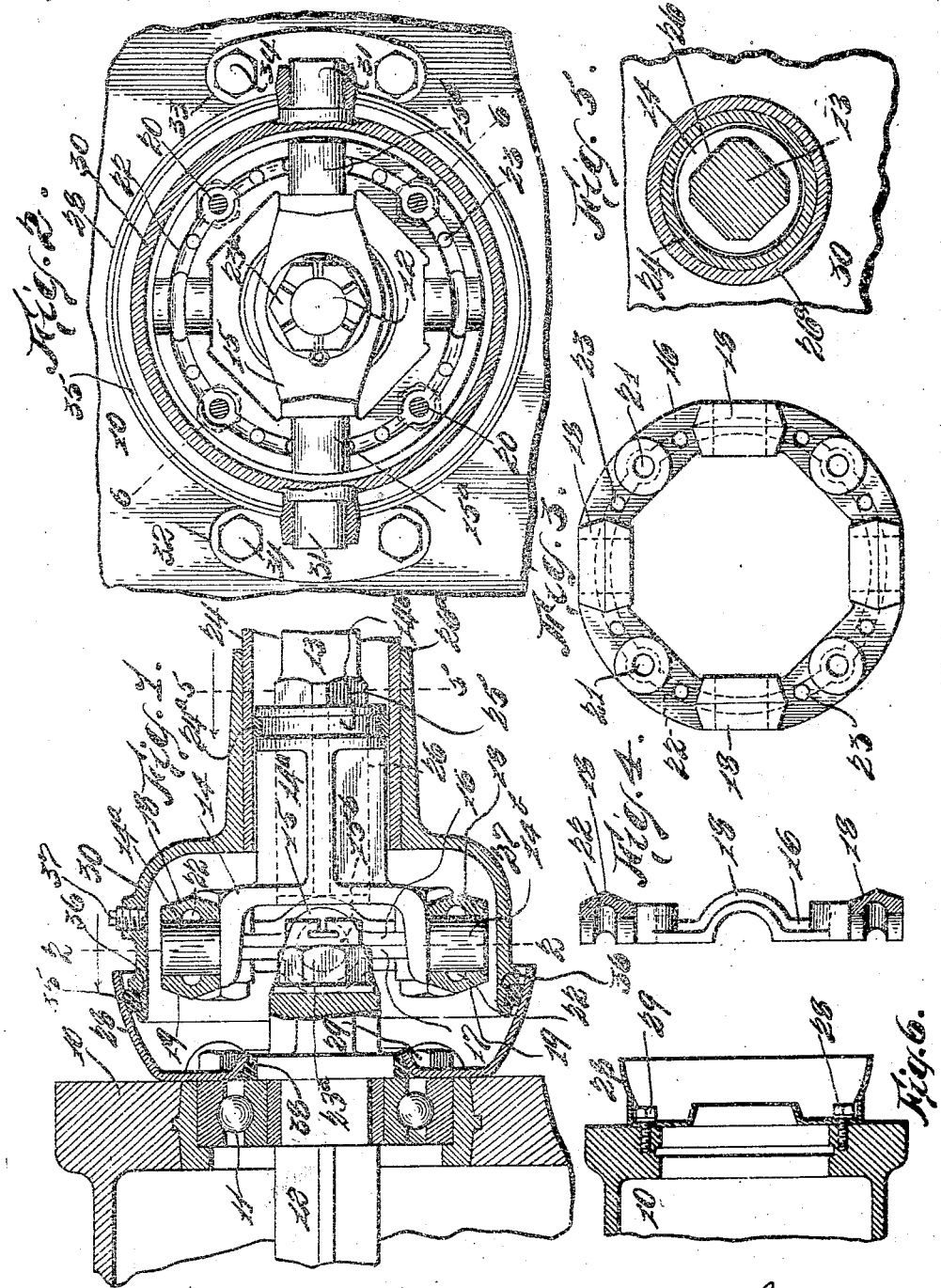

UNITED STATES PATENT OFFICE.

JOHN F. DODGE, OF DETROIT, AND HORACE E. DODGE, OF GROSSE POINT, MICHIGAN, ASSIGNORS TO DODGE BROTHERS, OF DETROIT, MICHIGAN, A CORPORATION OF MICHIGAN.

UNIVERSAL-JOINT MECHANISM.

1,144,531.                    Specification of Letters Patent.       Patented June 29, 1915.

Application filed August 27, 1914.   Serial No. 858,812.

*To all whom it may concern:*

Be it known that we, JOHN F. DODGE and HORACE E. DODGE, citizens of the United States, residing at Detroit, Michigan, and Grosse Point, Michigan, respectively, have invented certain new and useful Improvements in Universal-Joint Mechanism, of which the following is a clear, full, and exact description.

This invention relates to universal joint mechanism, more particularly designed for use in connection with the mechanism for driving the rear axle of a motor car, and which mechanism is arranged between the said axle, or rather the differential, and the speed change gear.

One of the objects of the invention is to provide an improved universal joint for transmitting motion from a transmission shaft to a drive-shaft, in such a way that the undulations of the rear wheels of the motor car will be taken up at the universal joint.

Another object of the invention is to provide for the longitudinal extension and contraction of the connecting means arranged between the said universal joint and the differential.

Another object of the invention is to provide an oscillatory or torque tube, which connects the casing for the differential gear with the casing or housing for the universal joint, and which tube may also have a longitudinal movement.

A further important object is to provide improved means for making a universal joint and its housing an oil-tight and dust-proof unit, without impairing the action of the joint.

Other objects of the invention are to provide simple, practical and efficient universal joint mechanism for motor cars.

These being among the objects of the present invention, the same consists of certain features of construction and combinations of parts to be hereinafter described and then claimed with reference to the accompanying drawings illustrating a suitable embodiment of the invention, in which—

Figure 1 is a longitudinal central section of the improved universal joint mechanism; Fig. 2 is a transverse section on the line 2—2 Fig. 1, looking in the direction of the arrow, and showing but one yoke; Fig. 3 is a plan view of a coupling device; Fig. 4 is a diametrical section of one of the rings of said coupling member; Fig. 5 is a transverse section on the line 5—5 Fig. 1; and Fig. 6 is a sectional detail, showing how the rigid housing section is secured. The section is taken on line 6—6, Fig. 2.

Referring to the drawings, the frame 10 is provided with ball or roller bearings 11 for a power transmission shaft 12, which is driven by change gears not shown. Said frame is usually a casing inclosing the change gears. Said shaft 12 is adapted to transmit its motion through a drive-shaft 13, in a manner to be described, which in turn is connected in any well-known or suitable manner with the differential mechanism (not shown). Owing to the undulations of the axle of the rear wheels of a motor car, the drive-shaft 13 should have a lateral play, and yet be capable of rotation by the transmission shaft 12. To this end the said shafts, are connected by means of a universal joint preferably of the construction shown. Said joint comprises two yokes 14, 15, respectively, the shanks of which are suitably connected with the said shafts while the formed or bifurcated ends or arms of the yokes are arranged so that one yoke spans the other, while the pivots 14ª, 14ᵇ, and 15ª, 15ᵇ, of the yokes are conjointly arranged within a suitable coupling. Said coupling comprises as shown in Figs. 1, 3 and 4 a pair of rings 16, 17, which are respectively provided with a series of equidistantly spaced half bearings 18 and 19. Said rings are of the same construction and they are positioned oppositely to each other by means of removable fastenings 20, which are passed through suitable openings 21 located between said half bearings. Previous to assembling the rings, the pivots of the yokes are positioned in the half bearings, which, when the rings are assembled and clamped together, constitute four complete bearings for the four pivot pins of the yokes. It will therefore be seen that the four pivot pins are equidistantly spaced and are arranged concentrically around the axial line of the shafts. The universal joint described permits oscillatory motion of the drive-shaft 13, while at the same time it enables the same to be rotated. Preferably and as more clearly shown in Figs. 3 and 4, each of the rings 16, 17 is provided with an annular channel such as 22 on its inner face, which channel extends along the bearing surfaces, and may receive a supply of lubricant through suitable inlet ports such as 23, inasmuch as the joint rotates within a body of lubricating oil.

The yoke 15 is keyed in any suitable manner to the transmission shaft 12 and is secured in position by lock-nuts at 23ᵃ. The other yoke 14 is set into one end of a tube 24, which tube extends to the differential casing and incloses the drive-shaft 13, while the end 25 of said drive-shaft 13 is preferably squared and adapted to slide in a correspondingly square opening 26 in the shank of said yoke 14. If the tube 24 also has a sliding motion, it is preferably located at its inner end within the sleeve 26ᵃ of a housing 27 so as to slide longitudinally in said sleeve, and said tube 24 is also adapted to have an oscillatory movement within said sleeve 26ᵃ, thus providing a torque tube which is slightly turned to the right or to the left, depending upon which of the rear wheels may strike an obstruction and thus incline the rear axle relatively to the body of the car.

Housing 27 comprises a hollow section 28, which is rigidly secured to the frame 10 as by screw-bolts 29, and another hollow section 30, on which is located said sleeve 26ᵃ. The housing section 30 is supported so as to move with the yoke 14 and concomitant parts. To this end the section 30 is preferably provided as shown clearly in Fig. 2 with pivots 31 which extend in opposite directions away from the housing and are supported in bearing boxes or brackets 32, 33, which are secured to the frame 10 as by screw-bolts 34. Both of said housing sections are therefore supported on the same frame 10. The axes of the pivots 31 are in the normal position of the parts, that is to say, when the two shafts 12, 13, are in alinement, in the same plane as the axes of the pivots of the universal joint. Also, the contact surface of the rigid section 28 of the housing is concentric with the middle point of the axis through pivots 31 which is at the center of movement of the yoke 15, that is to say, the middle point of the axis through pivots 14ᵃ and 14ᵇ. Consequently, said housing section 30 may partake of the same oscillatory motion as the coupling 16, 17, and associated parts, with the exception that it does not turn on its longitudinal axis, that is to say, said section 30 moves in the same plane as the universal joint, simultaneously with the up and down movement of the shaft 13. The rim of the housing section 30 is set within the rim of the housing section 28, and the joint between the two is closed as by means of a packing ring 35 which is received in an annular groove 36 in section 30. During the up and down movement of the section 30, the packing ring 35 will move with it in contact with the inner wall of the housing section 28 and thus seal the joint. Said sectional housing constitutes a receptacle for lubricating oil which is introduced thereinto through an opening which may be closed by a screw plug 37. It will be observed that the universal joint and the two sections of the housing are assembled as a unit upon the frame which supports them, and that said joint and housing constitute an oil-tight and dust-proof unit. The parts moving within the housing will therefore be properly lubricated due to the described construction and arrangement and particularly due to the oil channels in the coupling rings 16, 17. A packing ring 38 may be located in the joint between the wall of the central opening of the housing section 28, and the shank of the yoke 15, and another packing ring 24ᵃ may be arranged between the shank 14ᵃ of yoke 14 and the tube 24. Said packing ring 24ᵃ is fitted in a groove 14ᵇ in said shank 14ᵃ.

It is obvious that various changes can be made in the described construction as parts may be omitted, parts added, and parts substituted without departing from the spirit and scope of the invention.

What we claim as new is:—

1. In universal joint mechanism, the combination of two yokes adaptable to separate shafts, pivot pins extending in alinement on each yoke, and a yoke coupling comprising connected opposing rings, each provided with a plurality of half bearings corresponding in number to said pivot pins, the half bearings of one ring being opposed to the half bearings of the other ring and forming bearings receiving said pivot pins, said rings each having an oil channel communicating with said bearings, a sectional housing inclosing said parts, said sections having hollows which face one another, stationary means for rigidly supporting one section of said housing, and means located on said stationary means and separate from the contact surface of said rigid section for pivotally supporting the other section of said housing movably with respect to said surface of said rigid section, the contacting parts of said sections being at the greatest diameter of each of said sections and said housing forming a chamber for containing a body of lubricant in which said coupled yokes work and with which said oil channels communicate so that the parts of said coupling will be lubricated.

2. In universal joint mechanism, the combination of two shafts, a universal joint connecting them, a sectional housing for said joint comprising reversely hollowed sections, the hollows of said sections facing one another, stationary means for supporting one of the housing sections rigidly, the other housing section being fitted movably to and working against one face of the first housing section, the contacting parts of said sections being at the greatest diameter of each of said sections, and stationary means separate from the said face of the first said housing section but located outside the latter for supporting the other housing section in said working position.

3. In mechanism of the character described, the combination with a stationary housing section, of a movable housing section arranged in working relation to said stationary section, said sections having hollows which face one another, and stationary means located laterally of said stationary section and removed from the working surfaces of said housing sections for supporting said movable section, the contact faces of said housing sections being spherical, and the contacting parts thereof being at the greatest diameter of each of said sections.

4. In mechanism of the character described, the combination of a housing comprising sections fixed against rotation, means for supporting the same, two shafts extending into said housing, and means for coupling said shafts, one of said shafts being longitudinally slidable on one member of said coupling with respect to the other shaft, and a casing tube for said slidable shaft, extending from said housing, said member bearing in said casing tube and said casing tube having an oscillatory movement on said housing.

5. In universal joint mechanism, the combination with a universal joint, of a sectioned housing for said joint, comprising a stationary section and a movable section, said sections being hollowed reversely and having mutual working surfaces, stationary means external to said housing for supporting said movable section, and pivot connections between said supporting means and said movable section, the contacting parts of said working surfaces being at the greatest diameter of each of said sections.

6. In universal joint mechanism, the combination of two yokes, two shafts for supporting said yokes, pivot pins extending in alinement on each yoke, a yoke coupling comprising connected opposed rings, each provided with a plurality of half-bearings corresponding in number to said pivot pins, the half-bearings of one ring being opposed to the half-bearings of the other and forming bearings receiving said pivot pins, said rings having an oil channel communicating with said bearings and an oil inlet leading to said channel, a sectional housing for said connected yokes, comprising a rigid section, and a movable section having mutual working surfaces, a support for said parts, brackets fixed to said support outside of said rigid section, pivots extending laterally of said movable section and working in bearings of said brackets, and the working surface of said rigid section being concentric with the middle point of the axis of said pivots of said movable section, means for slidably connecting one of said shafts with one of said yokes, and a casing tube for said slidable shaft extending from the movable section of said housing, said last named yoke bearing in said casing tube and the latter having an oscillatory movement on and being slidable longitudinally with respect to said movable section.

Signed at Detroit, Mich., this 31 day of July, 1914.

JOHN F. DODGE.
HORACE E. DODGE.

Witnesses:
  W. R. WILSON,
  G. W. MASON.